Aug. 22, 1961  S. E. TAYLOR  2,996,813
FLASH READING MEANS
Filed May 27, 1960  2 Sheets-Sheet 2
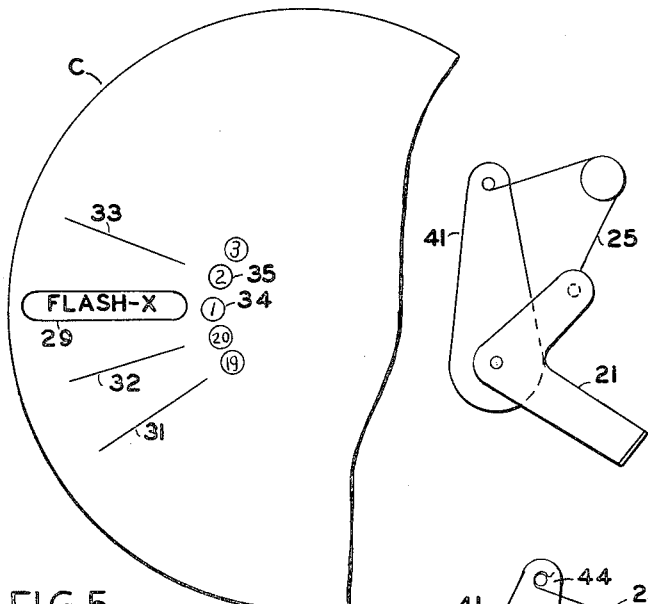
FIG 5
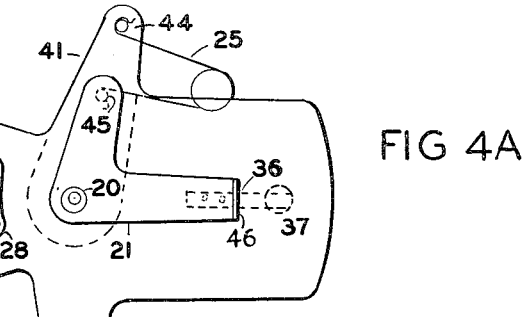
FIG 4B
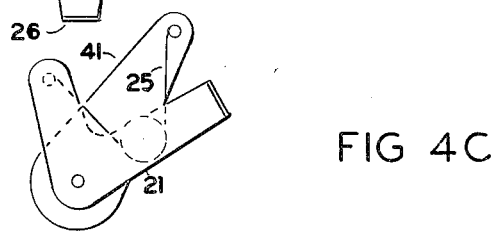
FIG 4A
FIG 4C
*INVENTOR.*
STANFORD E. TAYLOR องค์ 
United States Patent Office 2,996,813
Patented Aug. 22, 1961

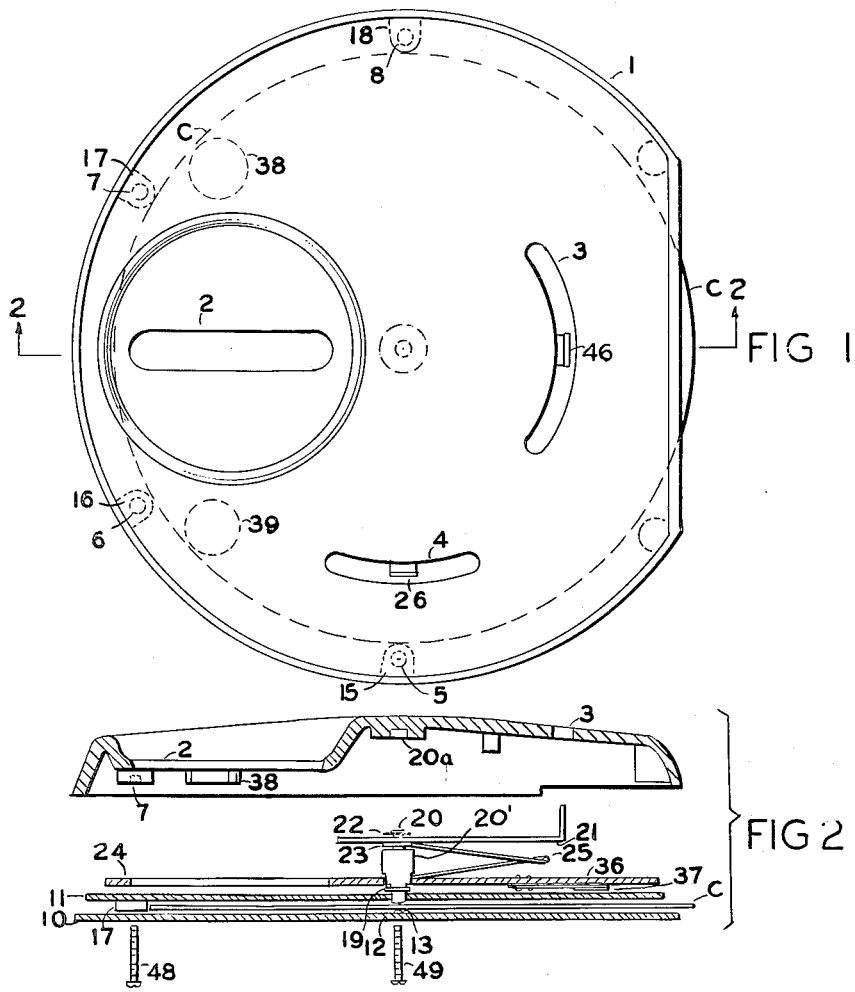
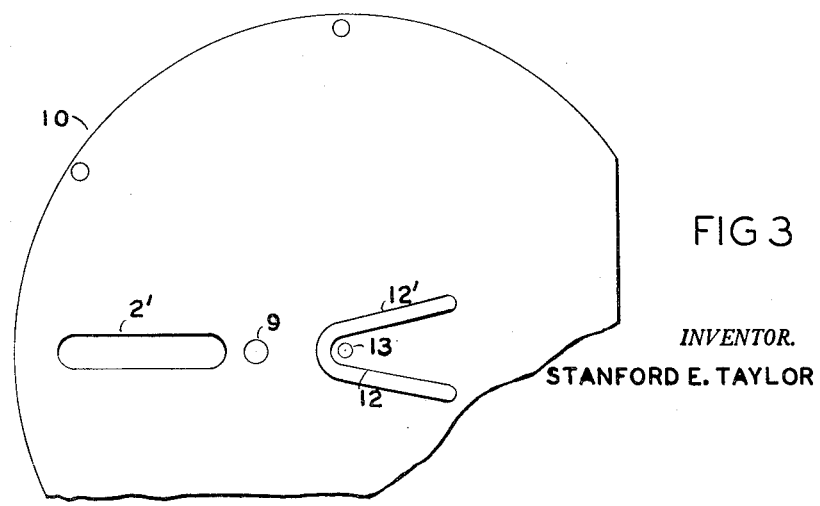

2,996,813
FLASH READING MEANS
Stanford E. Taylor, Centerport, N.Y., assignor to Educational Development Laboratories, Inc., Huntington, N.Y.
Filed May 27, 1960, Ser. No. 32,312
4 Claims. (Cl. 35—35)

This invention relates to a reading training device and more particularly to such means having a shutter arranged so that words, numbers, letters, pictures, groups of words, or other visual material are flashed or exposed to view for a very short time.

More specifically this invention relates to a new type of tachistoscope or perceptual training device. The purpose of this device is twofold: Through rapid timed exposures, to alert the student and train more rapid, accurate perception or to introduce new visual material to the student in such a way as to reduce drill and memorization time, both resulting in improved retention.

The invention comprises an individual training device adapted to be held in the hand or operated on a table and consisting of a flat disc-like housing adapted to receive removable cards containing the desired material to be exposed. A viewing aperture is provided in the cover so that words, a series of numbers or other material may be viewed. A shutter is provided so that the viewing is of the flash type having predetermined shutter intervals, for instance, one twenty-fifth of a second. The device preferably has a rear aperture for reading the correct answers which may be printed on the rear of the card.

The device greatly increases the concentration and attention of the student and the use of the device will greatly increase the speed of reading and train the user to read more accurately. It can develop better spelling ability and may also be used for instance, to teach multiplication tables or for question and answer problems, etc.

The device is substantially circular in shape and circular cards containing the desired information may be inserted and easily rotated. The cards may be indexed by means of index numbers on the card which may be viewed through a permanently open index window.

Accordingly a principal object of the invention is to provide new and improved reading means of the flash type.

Another object of the invention is to provide new and improved individual reading means of the type having a shutter adapted to be open a predetermined interval.

Another object of the invention is to provide new and improved reading means of the flash type adapted to receive removable cards containing the desired information.

Another object of the invention is to provide card means for the reading device of the present invention.

Another object of the invention is to provide a simple means of inserting and removing the training material such as can be accomplished by very young children.

It is another object of this invention to provide an individual training unit that is both highly portable and inexpensive and one that will enable a student to practice the most appropriate material privately.

It is another object of this invention, through a simplified toggle exposure mechanism, to create a reliable single speed exposure mechanism that will present material at a speed well in excess of that which would allow the trainee to make more than the original fixation or eye-stop in attempting to scrutinize the material being presented.

It is another object to create a device that will allow the student to check each exposure of material by opening the exposure window.

It is another object of this device to contain an additional window on the reverse side of the training unit that would allow for answers or an explanation of the material originally tachistoscopically exposed.

It is another object of this invention to create a device that would use an inexpensive and compact form of training material.

It is another object of this invention to use a type of indexing designation that would permit a quick and accurate registration of the training material in the exposure window.

It is another object of this device to employ a type of training material which could contain material on both sides.

These and other objects of the invention will be apparent from the following specifications and drawings of which FIGURE 1 is a plan view of the top cover of an embodiment of the invention, FIGURE 2 is a side, exploded view partially in section of the embodiment of FIGURE 1, FIGURE 3 is a bottom view of the back plate of the embodiment of FIGURE 2, FIGURES 4A, 4B and 4C are diagrams illustrating the operation of the shutter mechanism of the embodiment of FIGURE 2, and FIGURE 5 is a typical card disc for use in the embodiment of FIGURE 2.

Referring to the figures the invention generally comprises a substantially round housing partially flattened along one chord line comprising a top cover 1 which is preferably a die cast piece having a viewing aperture or slot 2, an operating lever slot 3, and a checking slot 4. The cover casting 1 also contains four tapped mounting holes 5, 6, 7 and 8.

The back cover 10 (FIG. 3) is shaped similarly to the top cover except it is flat. It has a viewing aperture 2' and index hole 9 along the same radius as the viewing aperture in the top plate. The purpose of the viewing aperture in the back plate is so that the answers read through the top plate may be checked through the rear plate which is open at all times. To do this the answers would have to be printed or written on the rear of the card. The back plate 10 also has a U-shaped slot 12' forming a tongue 12 having a dimple 13. The tongue 12 is sprung slightly so that the dimple 13 will provide a slight frictional force on the card C. Post 20 (FIG. 2) projects slightly throught plate 11 and is axial with dimple 13. This is to relieve card C from solidly rotating against plate 11, and causing unnecessary wear on printed surface. The card C is inserted through an opening adjacent the back cover, there being a slot opening along the flat chord edge between the back cover 10 and the interior mounting plate 11. The interior mounting plate 11 is spaced from the back plate 10 by means of the four spacers 15, 16, 17 and 18. The four spacers are round in shape and serve to center and permit rotation of the card C.

The shutter mechanism subassembly comprises a center post 20, an operating lever 21 rotatably mounted on the center post 20 by means of snap rings 22, 23. A pair of felt or cork pads 38 and 39 are mounted on the top cover 1 to stop the shutter plate 24 silently and without rebounding. The center post 20 has an enlarged spacer bushing 20' which serves to space the shutter plate 24, the shutter plate being held against the spacer 20' by means of the snap ring 19. The shutter plate 24 (FIG. 4A) has a leaf spring 36 riveted onto the end opposite the viewing slot 40. A small diameter pad 37 made of cork or some other friction material is secured onto the lower side of spring 36 facing plate 11 and rubs on plate 11.

The pad serves two functions:

(1) It slightly retards the shutter velocity so that a stronger torsion spring can be used. The stronger spring delivers a more uniform force over the stroke and holds the shutter firmer to the felt or cork pad stop 38 or 39 (FIG. 1) in the non operating position.

(2) When a rigid member is suddenly decelerated the kinetic energy must be totally absorbed or the member will rebound. The felt or cork pads (FIG. 1) which are used for stops absorb the greater amount of impact energy. These pads still have a small amount of resiliency. The rebound pad would be reflected into the torsion spring and an oscillatory condition would be established which would partially open the shutter in a series of damped pulses until the total energy is absorbed. The friction pad acts as a damper and quenches the vibratory motion.

The shutter plate is connected to the operating lever by means of the hairpin spring 25.

The shutter mechanism (FIG. 4B) is of a type having two stable positions, being tripped from one position to the other by moving the operating lever 21 from one position to the other. A handle 26 is connected to the shutter and extends through the checking slot 4 in the front plate, the purpose of the handle 26 being to move the shutter for continuous viewing if it is desired to check an answer. This handle will not trip the shutter mechanism.

The apparatus is assembled by first making a sandwich of the back plate 10 and the mounting plate 11 with the spacers 15, 16, 17 and 18. The shutter subassembly is then placed in the center hole of the mounting plate 11. The top cover 1 is then placed over the shutter subassembly, the top of the center post 20 fitting into a corresponding socket 20a in the top cover 1. The entire assembly is then connected by inserting screws 48, 49, etc. through the back cover 10, spacers 15, 16, 17, 18 into the tapped holes 5, 6, 7, 8 in the top cover.

FIGURE 5 shows a typical card C for insertion in the device. The card is round so that it will extend slightly from the flat portion of the device (FIG. 1) for easy removal and also for centering and indexing the card by slight rotational movements of the finger on the extending portion of the card. The desired information such as words, multiplication problems or other information is inserted either by printing or writing on the various spaces along different radii 31, 32, 33 of the card.

If it is desired to write on the cards the cards are preferably printed with slot outlines 29 for convenience in writing. Indexing marks or numbers 34, 35, etc. are provided along an inner circle on the card and they may be viewed at all times through the index slot 28 in the shutter 24 and slot 2 in the front cover. The indexing marks are for the purpose of centering the desired information under the viewing slot 2. It is not desirable to use mechanical detent indexing means for the cards as the cards will probably be of cardboard and would wear out rapidly. For the same reason there is preferably no center hole in the cards as such a hole would wear and limit the life of the cards. The centering provided by the four spacers 15–18 solves this problem without any appreciable wear on the cards. The spring pressure of the spring tongue 12 on the card is sufficient to hold the card from dropping out of the device but will not cause any appreciable wear of the cards.

The center mounting plate 11 has a large aperture in the vicinity of the viewing slot 2 so that the card may be read from both viewing slots in the front cover and also in the back cover.

FIGURES 4A, 4B and 4C show the operation of the shutter mechanism. The shutter 24 comprises a plate pivotally mounted on the center post 20 and containing a viewing aperture or slot 40 and two smaller extending arms 41 and 42. The arm 42 contains a projection 26 which extends through the slot 4 in the cover 1 for the purpose of moving the shutter to uncover the viewing aperture 2 for the purpose of checking an answer. This motion will not trip the shutter mechanism.

The other arm 41 of the shutter contains a pin 44 to which is connected one end of the hairpin spring 25. The other end of the spring 25 is connected to a pin 45 on one arm of the operating lever 21. The other arm of the operating lever 21 contains a projection 46 which extends through the slot 3 in the top cover. The motion of the projection 46 by the fingers of the operator from one extremity of the slot 3 past the unstable center position will trip the shutter so that the information on the card underneath the viewing slot will be uncovered for a predetermined interval, for instance $\frac{1}{25}$ of a second. The length of the interval is determined by the design of the shutter mechanism and is not adjustable.

FIGURE 4A shows the center position of the operating lever 21 and the shutter arm 41. This position is an unstable position as it is impossible to balance the hairpin spring 25 in this position, without holding the shutter.

FIGURE 4B shows the mechanism in one position.

FIGURE 4C shows the shutter plate in the other position. Only arm 41 of shutter 24 is shown in FIGS. 4B and 4C.

In operation, as the projection 46 is moved from one end of slot 3, as soon as it passes the unstable center position illustrated by FIGURE 4A then the hairpin spring 25 will snap to the other position uncovering the viewing aperture for a predetermined interval. Vice versa, when the projection 46 and operating lever 21 are moved to the opposite direction the reverse movement of the shutter will occur.

The present invention may be used for games, especially those relying on quick perception. For instance, aircraft, automobile or boat recognition games may be printed on the cards. Also a series of clues in a detective game or problems and various other games limited only by the imagination, may be used.

Also examinations especially speed tests, or visual perception tests may be given with the device.

Many modifications may be made by those who desire to practice the invention without departing from the scope thereof which is defined by the following claims.

I claim:

1. Flash reading means comprising a substantially flat disc-like housing having one flat edge and adapted to be held in the hand, a slot along said flat edge adapted to receive removable reading cards, so that said cards extend from said slot for turning by the operator, viewing slot means in said housing, including a shutter adapted to uncover said slot for predetermined intervals, such shutter comprising a plate pivotally mounted in said housing and having a shutter aperture larger than said viewing slot in said cover, and spring means connected to said plate adapted to trigger said shutter from one stable position to a second stable position.

2. Apparatus as in claim 1 wherein said housing is substantially circular and contains spacing means for centering a removable round card containing the desired information to be viewed, along radii thereof.

3. Flash reading means comprising a substantially round disc-like housing having front and back plates and adapted to be held in the hand and to receive removable reading cards, viewing slot means in said front and back plates along a common radius, a shutter adapted to uncover said slot in said front plate for predetermined intervals, such shutter comprising a plate pivotally mounted in said housing and having a shutter aperture underneath said viewing slot in said cover, and hairpin spring means adapted to trigger said shutter from one stable position to a second stable position.

4. Apparatus as in claim 3 having sound and energy absorbing means for said shutter.

References Cited in the file of this patent
UNITED STATES PATENTS

| | | |
|---|---|---|
| 2,647,329 | Bloch et al. | Aug. 4, 1953 |
| 2,723,466 | Ott | Nov. 15, 1955 |